L. CHAPMAN.
Dies for Forming Wrench-Heads.
No. 137,052 Patented March 25, 1873.
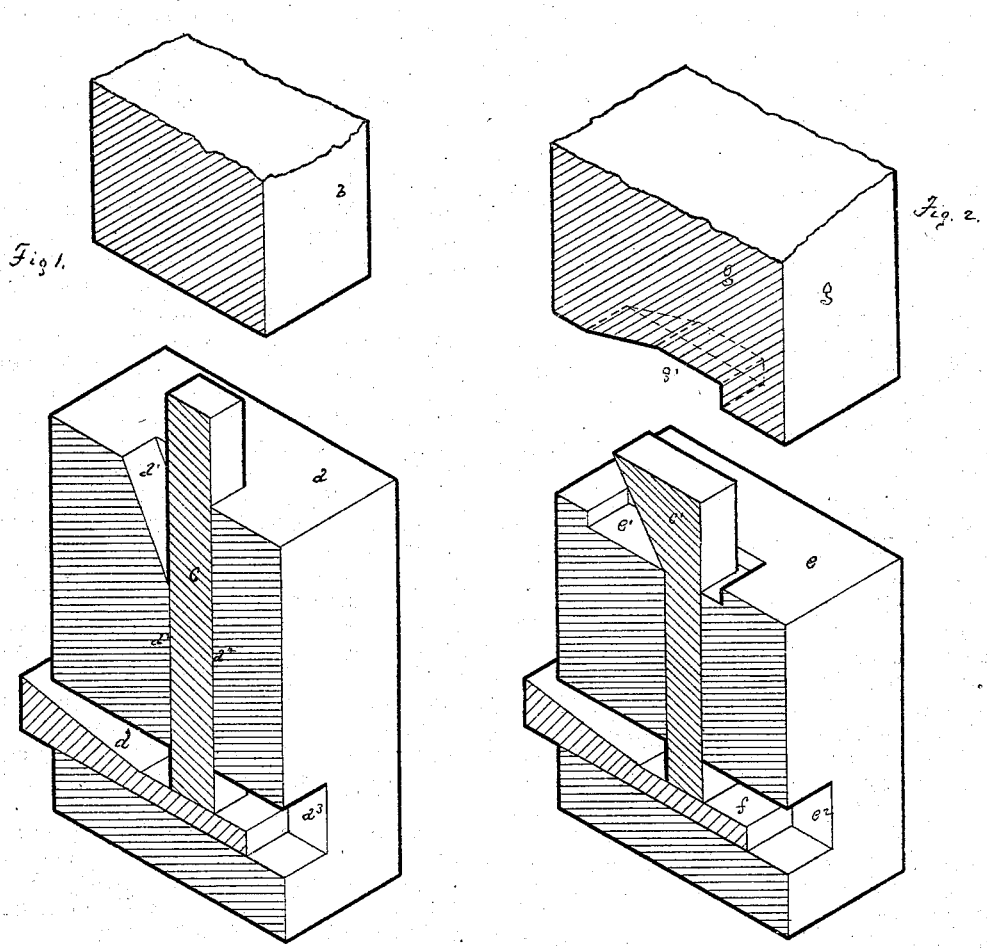

UNITED STATES PATENT OFFICE.

LUKE CHAPMAN, OF COLLINSVILLE, CONNECTICUT, ASSIGNOR TO THE COLLINS COMPANY, OF SAME PLACE.

IMPROVEMENT IN DIES FOR FORMING WRENCH-HEADS.

Specification forming part of Letters Patent No. 137,052, dated March 25, 1873.

*To all whom it may concern:*

Be it known that I, LUKE CHAPMAN, of Collinsville, in the county of Hartford and State of Connecticut, have invented certain new and useful Improvements in the Manufacture of Wrench-Heads, of which the following is a specification, reference being had to the accompanying drawing, in which—

Figure 1 is a central vertical section of the first set of dies made use of, with a bar inserted ready for the preliminary upsetting, showing just one-half of all the parts. Fig. 2 is a precisely-similar view of the second set of dies made use of for completing the upsetting process with the bar inserted, which has been acted upon by the first set of dies.

These figures are not intended to represent the size or proportions of the parts. The common method of forming these wrench-heads has been to take a bar of iron or steel of a width corresponding to the length of the wrench-head and of a thickness corresponding to the thickness of the wrench-head, and then, by hand-forging and the aid of certain forming-tools, form the wrench-head and draw down a part of the bar into the shape and size of the wrench-bar, this, of course, requiring skilled labor and considerable expense.

My invention consists in dies and process for forming a wrench-head upon a bar of the width and thickness of the wrench-bar, requiring only unskilled labor and at a great reduction of cost, the product being a much superior article than that formed by the old process.

The bar is first upset in the dies shown in Fig. 1, and the process is then finished and completed in the dies shown in Fig. 2, which completes the wrench-head.

The letter $a$ indicates the lower die of the first set having the opening $a^1$, and $b$ the upper die, its smaller surface a flat surface, which comes down under power on the end of the bar $c$, which has been heated to about a welding heat just before putting it in the die, and upsets it so as to just fill the opening $a^1$. The lower end of the bar runs down through the hole $a^2$ and rests upon the key $d$, which is wedge-shaped. By driving this key inward the bar can be started from its seat after the upper end has been upset. This key rests in the slot or channel $a^3$. The bar $c$, after being acted upon by the first set of dies, has a head upon it, $c'$, and thus formed it is put into the die $e$, as shown in Fig. 2, its lower end resting on the key $f$ in the slot $e^2$, which serves the same purpose as the key $d$. The die $e$ has a recess, $e^1$, in its upper surface, as shown in Fig. 2, and the upper die $g$ has a recess, $g'$, which, taken with the recess $e^1$, forms just the shape of a wrench-head. Before the bar $c$ is put into the second set of dies the head $c^1$ is heated to about a welding heat, so as to make it quite malleable. The die $g$ is then made to come down upon the die $e$ under power, and thus upsets the head $c$ into a complete wrench-head. The bar having the head $c'$ can be finished into a wrench-head in other ways and by other dies than those shown in Fig. 2, but these answer the purpose.

The second set of dies are capable under favorable conditions, and with nice care, of forming a wrench-head directly from the straight bar without previously heading it on the first set of dies, but the use of the two sets of dies is rather more practical.

I claim as my invention—

1. The die $a$, constructed and designed for use substantially as described, for the purpose set forth.

2. The combination of the dies $e$ and $g$, when constructed and designed for use substantially as described, for the purpose set forth.

3. The process of forming a wrench-head by first forming, by means of dies, a head upon the bar, substantially like $c'$, and then completing the forging by means of the second set of dies, substantially as described.

LUKE CHAPMAN.

Witnesses:
OLIVER F. PERRY,
EDWARD H. SEARS.